United States Patent
Kim

(10) Patent No.: US 12,063,131 B2
(45) Date of Patent: Aug. 13, 2024

(54) COMMUNICATION SIGNAL PROCESSING METHOD, AND BASE STATION AND HEADEND DEVICE USING THE SAME

(71) Applicant: SOLID, INC., Seongnam-si (KR)

(72) Inventor: Ok Jin Kim, Seongnam-si (KR)

(73) Assignee: SOLiD, INC., Seongnam-si (KR)

( * ) Notice: Subject to any disclaimer, the term of this patent is extended or adjusted under 35 U.S.C. 154(b) by 0 days.

(21) Appl. No.: 17/088,870

(22) Filed: Nov. 4, 2020

(65) Prior Publication Data

US 2021/0135917 A1 May 6, 2021

(30) Foreign Application Priority Data

Nov. 5, 2019 (KR) .................... 10-2019-0140464

(51) Int. Cl.
- *H04L 27/26* (2006.01)
- *H04L 47/283* (2022.01)
- *H04W 28/02* (2009.01)

(52) U.S. Cl.
CPC ........ *H04L 27/2605* (2013.01); *H04L 47/283* (2013.01); *H04W 28/0289* (2013.01)

(58) Field of Classification Search
CPC ............. H04L 27/2605; H04L 47/283; H04W 28/0289
See application file for complete search history.

(56) References Cited

U.S. PATENT DOCUMENTS

| | | | | |
|---|---|---|---|---|
| 2009/0067524 | A1* | 3/2009 | Li | H04L 27/2607 375/260 |
| 2012/0134279 | A1* | 5/2012 | Tamaki | H04B 7/0452 370/248 |
| 2014/0112667 | A1* | 4/2014 | Neukirch | H01Q 1/2291 398/115 |
| 2014/0211612 | A1* | 7/2014 | Dutti | H04L 45/28 370/225 |
| 2015/0117363 | A1* | 4/2015 | Rong | H04W 28/18 370/329 |
| 2015/0365889 | A1* | 12/2015 | Rajendran | H04W 16/08 455/453 |
| 2016/0309340 | A1* | 10/2016 | Malach | H04L 5/001 |
| 2017/0064642 | A1* | 3/2017 | Tarlazzi | H04B 17/19 |
| 2020/0067815 | A1* | 2/2020 | Lewis | H04L 45/121 |
| 2020/0128539 | A1* | 4/2020 | Abedini | H04L 5/005 |
| 2022/0352929 | A1* | 11/2022 | Jang | H04B 17/15 |

* cited by examiner

*Primary Examiner* — Huy D Vu
*Assistant Examiner* — Robert Ma
(74) *Attorney, Agent, or Firm* — Sughrue Mion, PLLC

(57) ABSTRACT

A communication signal processing method comprises obtaining transmission delay value difference data relating to a difference in transmission delay values in a communication network that varies depending on whether or not a redundant path is used, obtaining redundancy status data relating to whether the redundant path is used, and controlling a parameter of a communication signal transmitted by the communication network based on the transmission delay value difference data when the redundant path is used as a result of determination according to the redundancy status data.

11 Claims, 5 Drawing Sheets

COMMUNICATION SIGNAL PROCESSING METHOD, AND BASE STATION AND HEADEND DEVICE USING THE SAME

CROSS-REFERENCE TO RELATED APPLICATIONS

This application claims the benefits of Korean Patent Applications No. 10-2019-0140464, filed on Nov. 5, 2019, in the Korean Intellectual Property Office, the disclosures of which are incorporated herein in their entireties by reference.

BACKGROUND

1. Field

The disclosure relates to a communication signal processing method, and a base station and a headend device using the same, and more particularly, to a communication signal processing method capable of controlling parameters of communication signals transmitted by a communication network based on a difference in transmission delay values when a redundant path is not used and when a redundant path is used, and a base station and a headend device using the same.

2. Description of the Related Art

Even when a problem occurs in an existing communication line, a communication network may be designed in a redundant form to stably provide a communication service.

When a communication line is changed in a redundant communication network, a transmission delay time of a communication signal may be affected by the change of the communication line.

SUMMARY

Provided are a communication signal processing method capable of controlling parameters of communication signals transmitted by a communication network based on a difference in transmission delay values when a redundant path is not used and when a redundant path is used, and a base station and a headend device using the same.

According to an aspect of an embodiment, a communication signal processing method may comprise obtaining transmission delay value difference data relating to a difference in transmission delay values in a communication network that varies depending on whether or not a redundant path is used, obtaining redundancy status data relating to whether the redundant path is used and controlling a parameter of a communication signal transmitted by the communication network based on the transmission delay value difference data when the redundant path is used as a result of determination according to the redundancy status data.

According to an aspect of an embodiment, the communication network may be a distributed antenna system.

According to an aspect of an embodiment, the transmission delay value difference data may be data relating to a difference between a transmission delay value in the communication network when the redundant path is used and a transmission delay value in the communication network when the redundant path is not used.

According to an aspect of an embodiment, the obtaining of the redundancy status data may comprise obtaining the redundancy status data based on whether at least one communication node is switched from among communication nodes in the communication network.

According to an aspect of an embodiment, the redundancy status data may be transmitted from the communication network to a base station through an interface configured separately from a communication line through which the communication signal is transmitted.

According to an aspect of an embodiment, the controlling of the parameter of the communication signal may comprise controlling a time align (TA) value of the communication signal.

According to an aspect of an embodiment, the controlling of the parameter of the communication signal may comprise in a case of using the redundant path, reducing the TA value of the communication signal to maintain the total delay value the same as in a case of not using the redundant path.

According to an aspect of an embodiment, the controlling of the parameter of the communication signal may comprise controlling the length of cyclic prefix (CP) of the communication signal.

According to an aspect of an embodiment, the controlling of the parameter of the communication signal may comprise in a case of using the redundant path, changing the CP of the communication signal from a normal CP type to an extended CP type.

According to an aspect of an embodiment, the controlling of the parameter of the communication signal may comprise controlling the length of a guard period (GP) of the communication signal.

According to an aspect of an embodiment, the controlling of the parameter of the communication signal may comprise in a case of using the redundant path, increasing the length of the GP of the communication signal.

According to an aspect of an embodiment, a base station may comprise a memory and a processor, and control a parameter of a communication signal according to a state of a distributed antenna system, the base station may be configured to obtain transmission delay value difference data relating to a difference in transmission delay values in the distributed antenna system, which varies depending on whether or not a redundant path is used, obtain redundancy status data relating to whether the redundant path is used, and control a parameter of a communication signal transmitted by the distributed antenna system based on the transmission delay value difference data when the redundant path is used as a result of determination according to the redundancy status data.

According to an aspect of an embodiment, a headend may comprise a memory and a processor, and control a parameter of a communication signal according to a distributed antenna system, the headend device may be configured to obtains transmission delay value difference data relating to a difference in transmission delay values in the distributed antenna system, which varies depending on whether or not a redundant path is used, obtain redundancy status data relating to whether the redundant path is used, and control the parameter of the communication signal transmitted by the distributed antenna system based on the transmission delay value difference data when the redundant path is used as a result of determination according to the redundancy status data.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
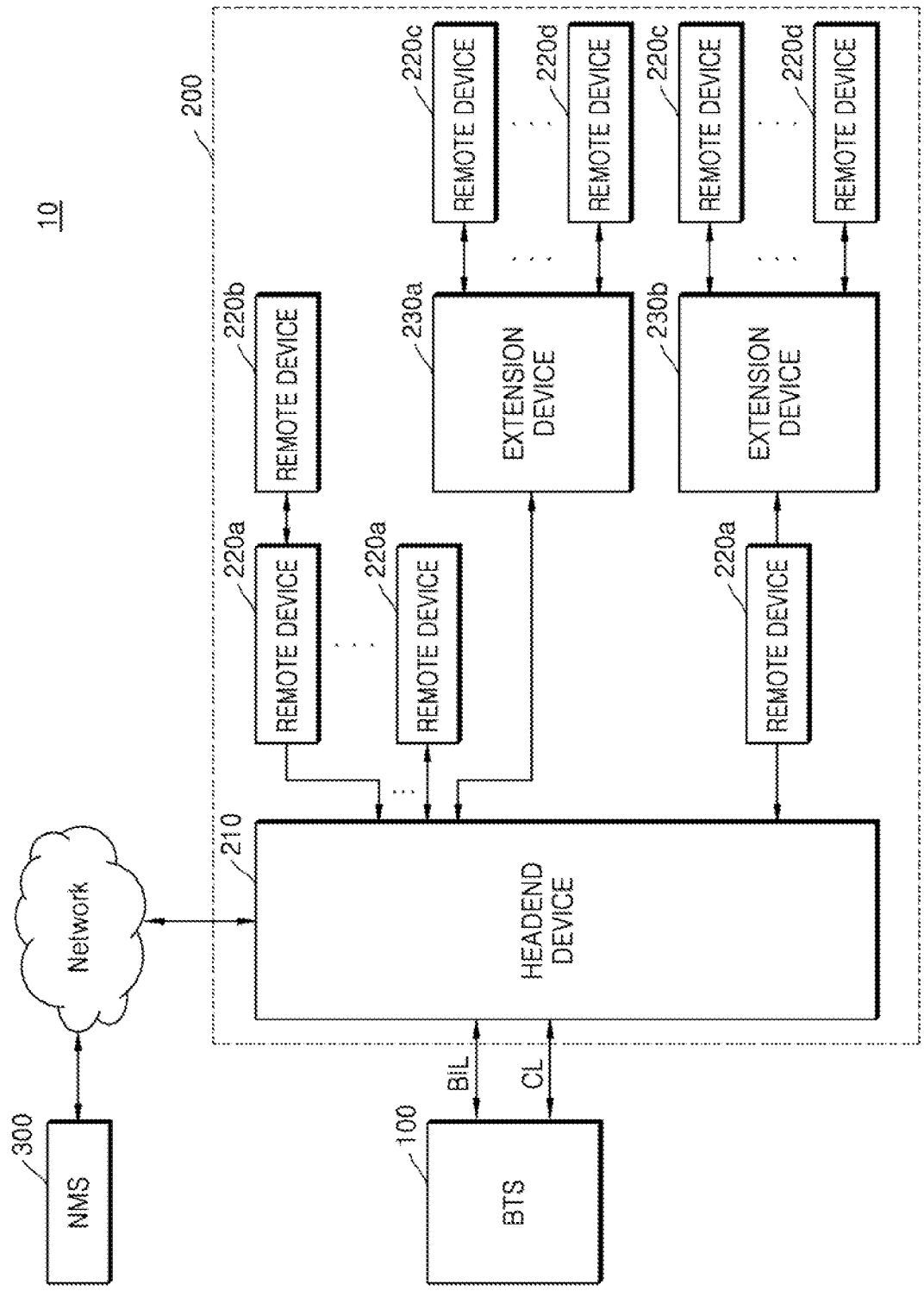
FIG. 1 is a conceptual diagram of a communication system according to an embodiment.

The inventive concept may be variously modified and have various embodiments, so that specific embodiments will be illustrated in the drawings and described in the detailed description. However, this does not limit the inventive concept to specific embodiments, and it should be understood that the inventive concept covers all the modifications, equivalents and replacements included within the idea and technical scope of the inventive concept.

In describing the inventive concept, in the following description, a detailed explanation of known related technologies may be omitted to avoid unnecessarily obscuring the subject matter of the present disclosure. In addition, numeral figures (e.g., 1, 2, and the like) used during describing the specification are just identification symbols for distinguishing one element from another element.

Further, in the specification, if it is described that one component is "connected" or "accesses" the other component, it is understood that the one component may be directly connected to or may directly access the other component but unless explicitly described to the contrary, another component may be "connected" or "access" between the components.

In addition, terms including "unit," "er," "or," "module," and the like disclosed in the specification mean a unit that processes at least one function or operation and this may be implemented by hardware or software such as a processor, a micro processor, a micro controller, a central processing unit (CPU), a graphics processing unit (GPU), an accelerated Processing unit (APU), a digital signal processor (DSP), an application specific integrated circuit (ASIC), and a field programmable gate array (FPGA) or a combination of hardware and software. Furthermore, the terms may be implemented in a form coupled to a memory that stores data necessary for processing at least one function or operation.

Moreover, it is intended to clarify that components in the specification are distinguished in terms of primary functions of the components. That is, two or more components to be described below may be provided to be combined to one component or one component may be provided to be divided into two or more components for each more subdivided function. In addition, each of the respective components to be described below may additionally perform some or all functions among functions which other components take charge of in addition to a primary function which each component takes charge of and some functions among the primary functions which the respective components take charge of are exclusively charged by other components to be performed, of course.

Referring to FIG. 1, a communication system 10 may include a base transceiver station (BTS) 100, a distributed antenna system (DAS) 200 for relaying communication signals of the base station 100, and a network management server or a network management system (NMS) 300 for managing and monitoring the DAS 200.

The DAS 200 may include a headend device 210 that constitutes a headend node and are communicatively connected to the BTS 100, a plurality of remote devices 220a, 220b, 220c, and 220d that constitute a remote node and are connected to another remote node or communicatively connected to a user terminal by being arranged at each remote service location, and extension devices 230a and 230b that constitute an extension node.

According to an embodiment, the DAS 200 may be implemented as an analog DAS.

According to another embodiment, the DAS 200 may be implemented as a digital DAS, and in some cases may be implemented in a hybrid type, for example, in the form of analog processing for some nodes and digital processing for other nodes.

Meanwhile, FIG. 1 shows an example of a topology of the DAS 200 and various variations are possible in the DAS 200 considering specificity of installation areas and application fields (e.g., in-building, a subway, a hospital, a stadium, etc.).

According to an embodiment, the headend device 210, the remote devices 220a, 220b, 220c, and 220d, and the expansion devices 230a and 230b may include a redundant structure, and an example of the redundant structure will be described later with reference to FIG. 2.

In addition, the DAS 200 is an example of a communication network that transmits a communication signal, and may directly perform some functions of the BTS 100 according to an embodiment.

According to an embodiment, a structure of the DAS 200 may be implemented in a form including a redundant structure described later in FIG. 2.

The extension devices 230a and 230b in the DAS 200 may be utilized when the number of branches of the headend device 210 is limited compared to the number of remote devices to be installed.

Each node in the DAS 200 and its function will be described in more detail. First, the headend device 210 may serve as an interface with a base station.

The headend device 210 may transmit and receive a communication signal with the BTS 100 through a communication line CL. The headend device 210 may transmit and receive data used for parameter control of the communication signal through a base station interface line BIL provided separately from the communication line CL.

According to an embodiment, the headend device 210 may be connected to a plurality of base stations.

According to an embodiment, the headend device 210 may be implemented with a main headend device and a sub headend device, and may be connected to a base station for each service frequency band of a specific service provider or a base station for each sector. In some cases, the main headend device may compensate for coverage by the sub headend device.

In general, because a radio frequency (RF) signal transmitted from a base station is a high-power signal, the headend device 210 may attenuate such a high-power RF signal into a signal of power suitable for processing at each node. The headend device 210 may lower a high-power RF signal for each frequency band or for each sector to a low-power RF signal. The headend device 210 may be combined with the low-power RF signal and may distribute the combined signal to the extension device 230a or the remote device 220a.

According to an embodiment, the headend device 210 may directly receive a communication signal (e.g., Common Public Radio Interface (CPRI), Open Radio Interface (ORI), Open Baseband Remote Radiohead Interface (OBSAI), or e-CPRI, etc.) in a digital format from a base station.

Each of the remote devices 220a, 220b, 220c, and 220d may separate received combined signals for each frequency band and perform signal processing such as amplification. Accordingly, each of the remote devices 220a, 220b, 220c, and 220d may transmit a base station signal to a user terminal in its service coverage through a service antenna (not shown).

The remote device 220a and the remote device 220b may be connected to each other through an RF cable or wireless communication, and a plurality of remote devices may be connected to each other in a cascade structure if necessary.

The extension device 230a may transmit the distributed combined signal to the remote device 220c connected to the extension device 230a.

The extension device 230b is connected to one end of the remote device 220a and may receive a signal received from the headend device 210 through the remote device 220a in downlink communication. The extension device 230b may transmit the received signal back to the remote device 220d connected to a rear end of the extension device 230b.

Although FIG. 1 shows that the BTS 100 and the headend device 210 are mutually connected through an RF cable, and further mutually connected through an optical cable at a lower end of the headend device 210 except between the remote device 220a and the remote device 220b, a signal transport medium between nodes or a communication method thereof may vary.

For example, at least one of between the headend device 210 and the extension device 230a, between the headend device 210 and the remote device 220a, and between the extension devices 230a and 230b and the remote device 220c and 220d may be connected through an RF cable, a twisted cable, a UTP cable or the like in addition to the optical cable.

According to an embodiment, when internal components of the DAS 200 are connected to each other by an optical cable, the headend device 210, the remote devices 220a, 220b, 220c, and 220d, and the extension devices 230a and 230b may include an optical transceiver module for transmitting and receiving optical signals through electro-optical conversion/photoelectric conversion, and may further include a wavelength division multiplexing (WDM) device when nodes are connected to each other by a single optical cable.

The DAS 200 may be connected to an external management device (not shown) such as the NMS 300 or a network operation center (NOC) (not shown) via a network. Accordingly, an administrator may remotely monitor the status and problem of each node of the DAS 200, and may remotely control the operation of each node.

Figure 2:
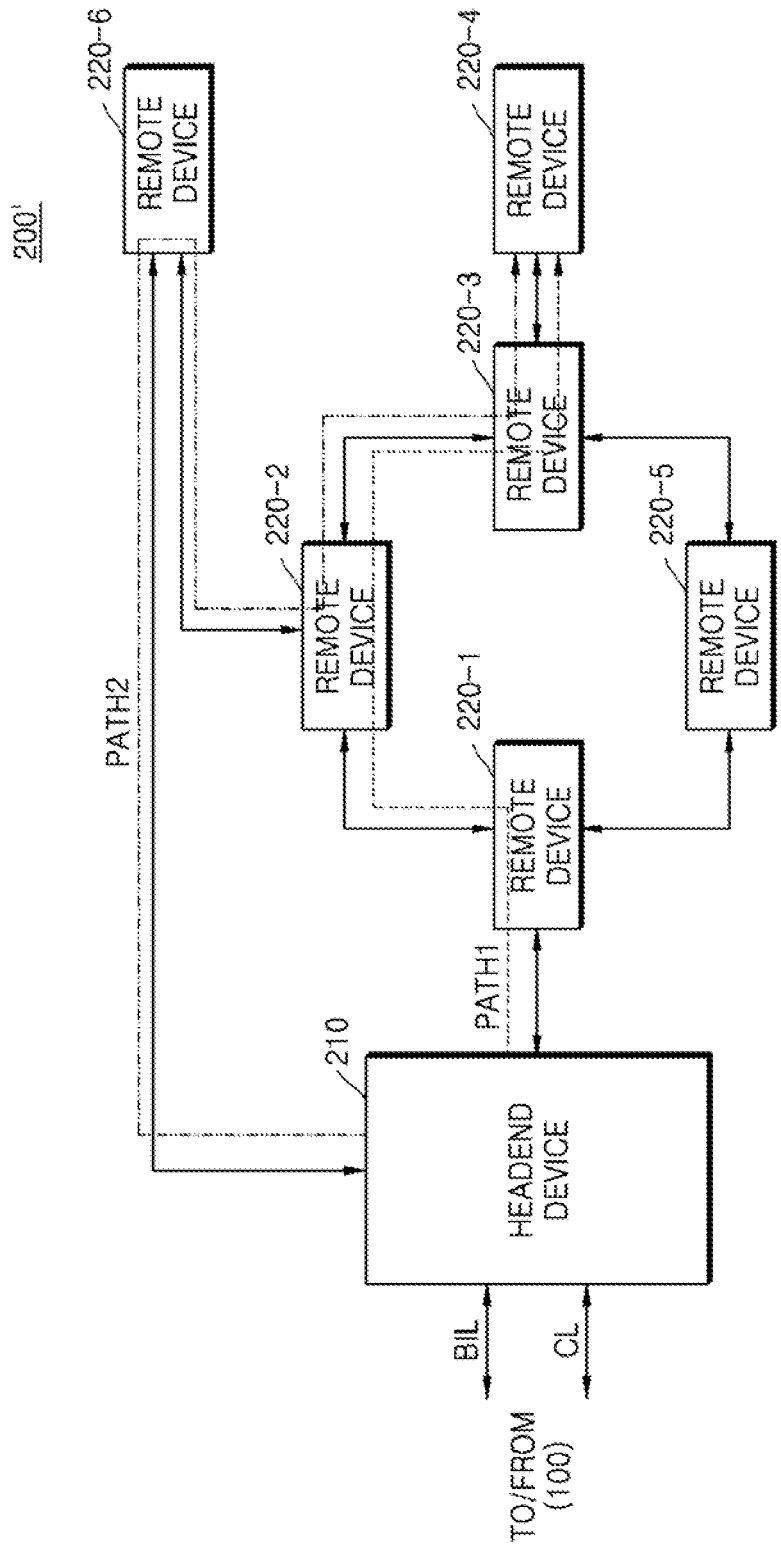
FIG. 2 is a view of a redundant structure according to an embodiment of a distributed antenna system illustrated in FIG. 1.

FIG. 2 is a view of a redundant structure according to an embodiment of the DAS 200 illustrated in FIG. 1.

Referring to FIGS. 1 and 2, a DSA 200' may include the headend device 210 that communicates with the BTS 100, and remote devices 220-1 to 220-6 that transmit and receive communication signals with the headend device 210.

The headend device 210 may be communicatively connected to the BTS 100 through the communication line CL for exchanging communication signals with the BTS 100, and the base station interface line BIL configured separately from the communication line CL to exchange communication signals with the BTS 100.

According to an embodiment, the fourth remote device 220-4 may perform wireless communication with user terminals (not shown) within coverage.

When there is no failure or problem in communication nodes in the DAS 200', the fourth remote device 220-4 may relay transmission of a communication signal between the headend device 210 and a user terminal through a first communication signal path PATH1.

When a failure or problem occurs on the first communication signal path PATH1, in the DAS 200', the connection of at least one communication node in which a problem has occurred (e.g., the remote devices 220-1 to 220-5) is switched over, and communication may be performed through a redundant path (e.g., a second communication signal path PATH2).

According to an embodiment, switching of the at least one communication node in which a problem has occurred and connection of the redundant path may be performed under control of the headend device 210 or the NMS 300 connected to the headend device 210.

In this case, as the communication signal transmitted to the user terminal through the fourth remote device 220-4 is transmitted through respective paths PATH1 and PATH2 by the switching of the communication node, a delay value generated while a communication signal passes through the DAS 200 may vary.

The headend device 210 may receive a first transmission delay value when a communication signal is transmitted to the fourth remote device 220-4 through the first communication signal path PATH1 from the fourth remote device 220-4, and may receive a second transmission delay value when a communication signal is transmitted to the fourth remote device 220-4 through the second communication signal path PATH2.

The first transmission delay value may be a delay value generated while a communication signal is transmitted from the headend device 210 to the fourth remote device 220-4 through the first communication signal path PATH1. The second transmission delay value may be a delay value generated while a communication signal is transmitted from the headend device 210 to the fourth remote device 220-4 through the second communication signal path PATH2.

According to an embodiment, each of the first transmission delay value and the second transmission delay value may be the transmission delay value obtained from any one (e.g., the fourth remote device 220-4) of the plurality of communication nodes, or may be a value (e.g., an average value, etc.) calculated using the transmission delay values respectively obtained from the plurality of communication nodes.

The headend device 210 may obtain transmission delay value difference data corresponding to a difference between the received first transmission delay value and the received second transmission delay value.

According to an embodiment, the headend device 210 may store the transmission delay value difference data in a memory inside the headend device 210.

According to another embodiment, the headend device 210 may transmit the transmission delay value difference data to the BTS 100 through the base station interface line BIL. In this case, the BTS 100 may store the transmission delay value difference data in a memory inside the BTS 100.

The headend device 210 may obtain redundancy status data relating to whether a redundant path is used.

According to an embodiment, the headend device 210 may obtain redundancy status data relating to whether a redundant path is used based on whether at least one communication node is switched. For example, when at least one communication node is switched, the headend device 210 may obtain redundancy status data indicating that a redundant path is used.

According to an embodiment, the headend device 210 may transmit the redundancy status data to the BTS 100 through the base station interface line BIL. In this case, the BTS 100 may control a parameter of a communication signal transmitted by a communication network (e.g., the DSA 200') based on the transmission delay value difference data when a redundant path is used as a result of determination according to the redundancy status data.

According to another embodiment, the headend device 210 may directly determine whether to use a redundant path according to the redundancy status data. When a redundant path is used as a result of the determination, the headend device 210 may control a parameter of a communication signal transmitted by a communication network (e.g., the DSA 200') based on the stored transmission delay value difference data.

According to an embodiment, the parameter of the communication signal may be time align (TA), cyclic prefix (CP), or a guard period (GP).

A specific form in which the parameter of the communication signal is controlled will be described later with reference to FIGS. 3 to 5.

Figure 3:
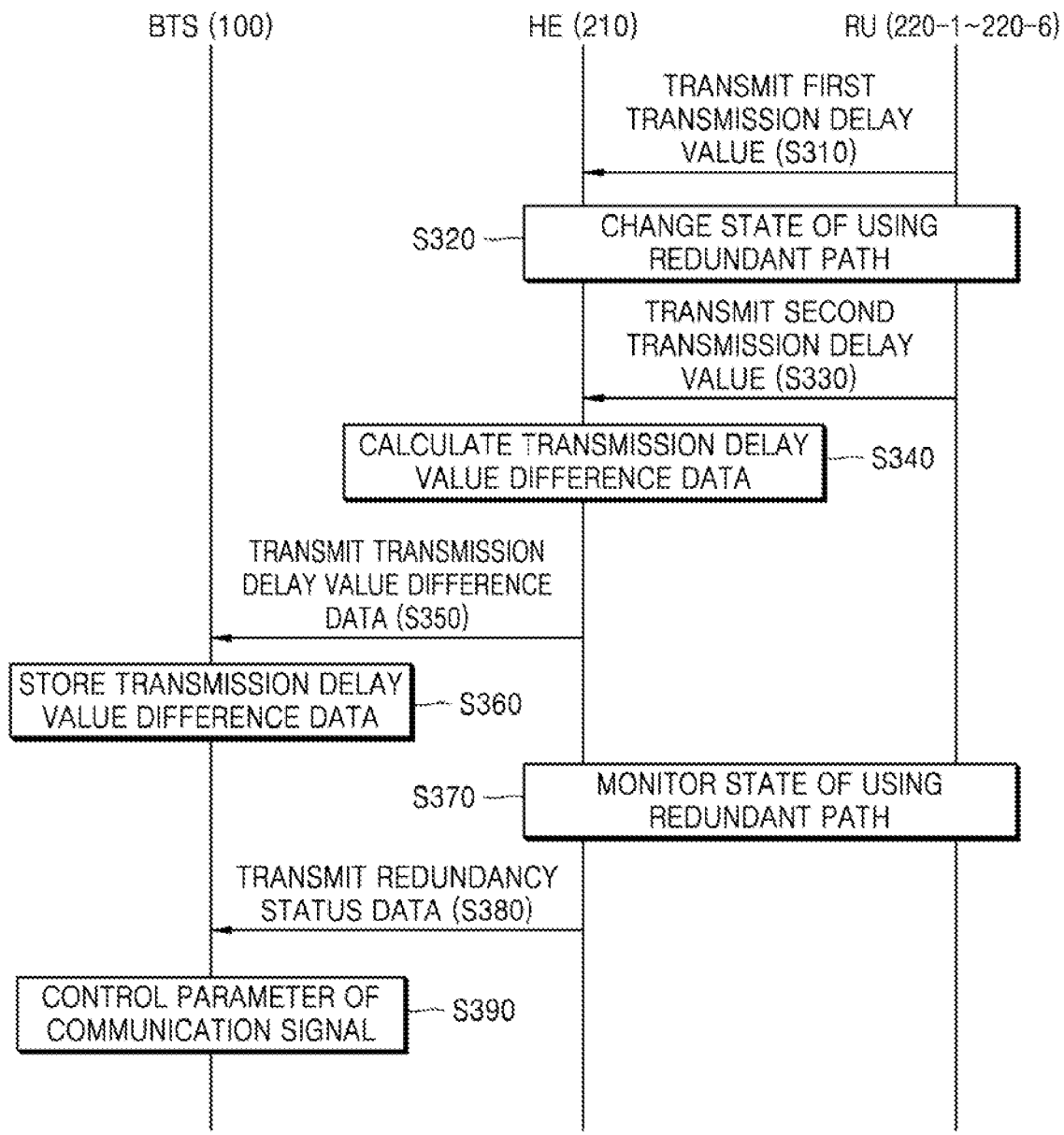
FIG. 3 is a data flowchart illustrating a process of performing a communication signal processing method according to an embodiment, in a communication system.

FIG. 3 is a data flowchart illustrating a process of performing a communication signal processing method according to an embodiment, in a communication system. FIG. 4 is a view illustrating an embodiment in which a communication parameter is adjusted according to the communication signal processing method illustrated in FIG. 3. FIG. 5 is a view illustrating examples of communication parameters that can be adjusted according to the communication signal processing method illustrated in FIG. 3.

Referring to FIG. 3, in operation S310, a remote device (e.g., at least any one of 220-1 to 220-6) may transmit a first transmission delay value in a DAS (e.g., 200') to the headend device 210 without using a redundant path.

In operation S320, the DAS (e.g., 200') may change the state of using a redundant path to measure a change in a transmission delay value depending on whether or not a redundant path is used.

After changing the state of using a redundant path according to operation S320, in operation S330, the remote device (e.g., at least any one of 220-1 to 220-6) may transmit a second transmission delay value in the DAS (e.g., 200') to the headend device 210 while using a redundant path.

In operation S340, the headend device 210 may calculate and obtain transmission delay value difference data relating to a difference between the first transmission delay value received in operation S310 and the second transmission delay value received in operation S330.

In operation S350, the headend device 210 may transmit the obtained transmission delay value difference data to the BTS 100.

In operation S360, the BTS 100 may store the transmission delay value difference data received from the headend device 210.

In operation S370, the headend device 210 may monitor the state of using a redundant path in the DAS (e.g., 200').

In operation S380, the headend device 210 may transmit redundancy status data relating to the state of using a redundant path monitored in operation S370 to the BTS 100.

In operation S390, the BTS 100 may control a parameter of a communication signal based on the transmission delay value difference data stored in operation S360 when a redundant path is used as a result of determination according to the redundancy status data received in operation S380.

According to an embodiment, the parameter of the communication signal controlled in operation S390 may be TA, CP, or a GP.

According to an embodiment, when the headend device 210 performs at least some functions of the BTS 100, the transmission delay value difference data obtained by calculating in operation S340 may be stored in the headend device 210. In this case, the headend device 210 determines whether to use a redundant path based on the redundancy status data in operation S370, and when a redundant path is used, may directly control a parameter of a communication signal based on the transmission delay value difference data.

Figure 4:
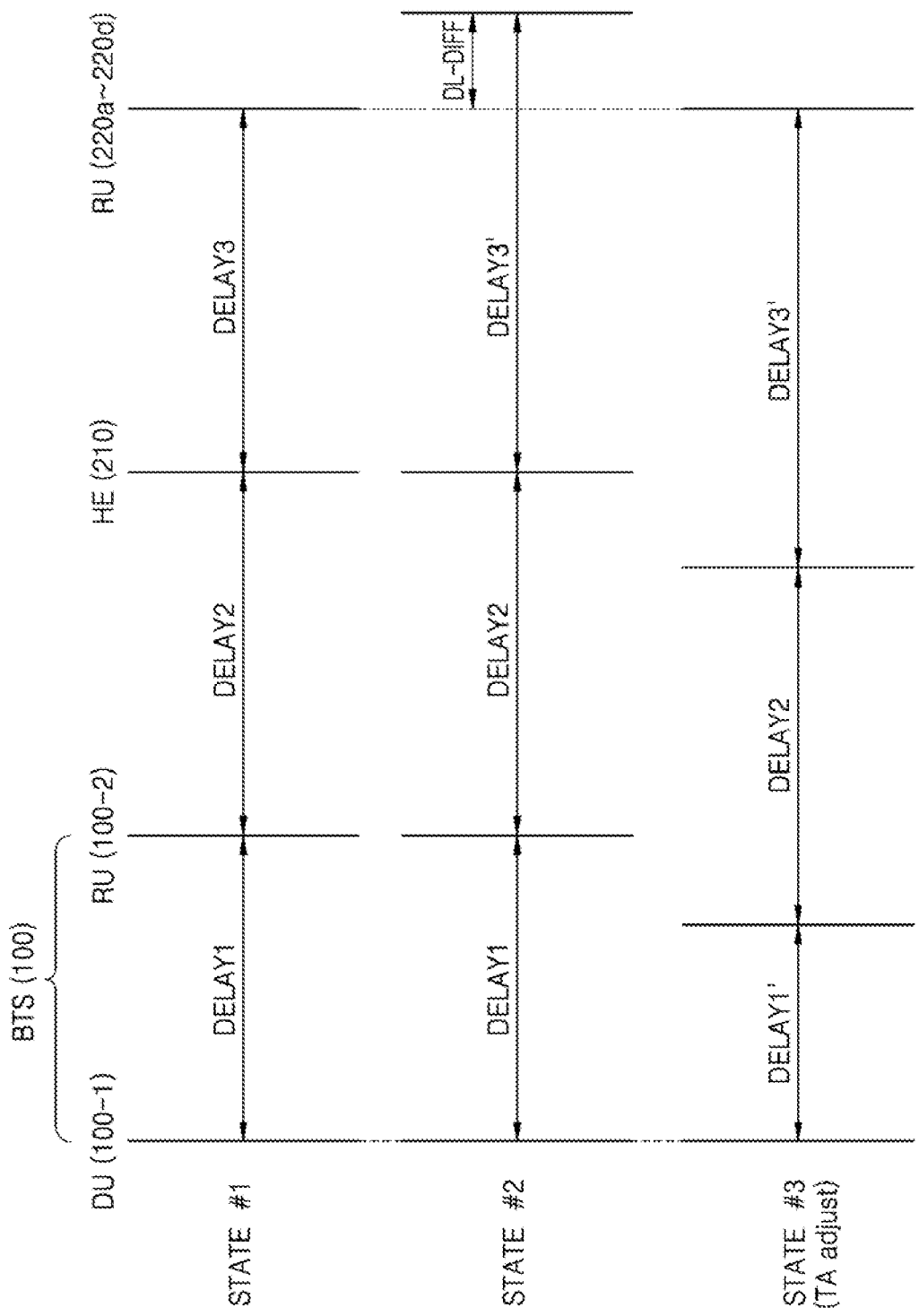
FIG. 4 is a view illustrating an embodiment in which a communication parameter is adjusted according to the communication signal processing method illustrated in FIG. 3.

Referring to FIG. 4 together, in operation S390, the BTS 100 may control a TA value of a communication signal.

A first state STATE #1 denotes transmission delay values of a communication signal transmission process in a communication system when a redundant path is not used. At this time, a transmission delay value between a DU 100-1 and an RU 100-2 in the BTS 100 is shown as a first delay value DELAY1, a transmission delay value between the 100-2 and the headend device 210 is shown as a second delay value DELAY2, and a transmission delay value between the headend device 210 and the plurality of remote devices 220-1 to 220-6 is shown as a third delay value DELAY3. According to an embodiment, the third delay value DELAY3 may be a transmission delay value between the headend device 210 and any one of the plurality of remote devices 220-1 to 220-6 (e.g., 220-4).

A second state STATE #2 denotes transmission delay values of a communication signal transmission process in a communication system when a redundant path is used. At this time, a transmission delay value between the DU 100-1 and the RU 100-2 in the BTS 100 is the first delay value DELAY1, which is the same as the first state STATE #1, and a transmission delay value between the RU 100-2 and the headend device 210 is the second delay value DELAY2, which is the same as the second state STATE #1. A transmission delay value between the headend device 210 and the remote devices 220-1 to 220-6 is a different third delay value DELAY3', and may be increased by a difference in transmission delay values DL-DIFF compared to the first state STATE #1.

A third state STATE #3 denotes transmission delay values of a communication signal transmission process in a communication system when the BTS 100 adjusts a TA value from among parameters of a communication signal while using a redundant path. According to an embodiment, the BTS 100 may reduce the TA value to maintain the total delay value (DELAY1'+DELAY2+DELAY3') equal to the total delay value (DELAY1+DELAY2+DELAY3) when a redundant path is not used (STATE #1).

Figure 5:
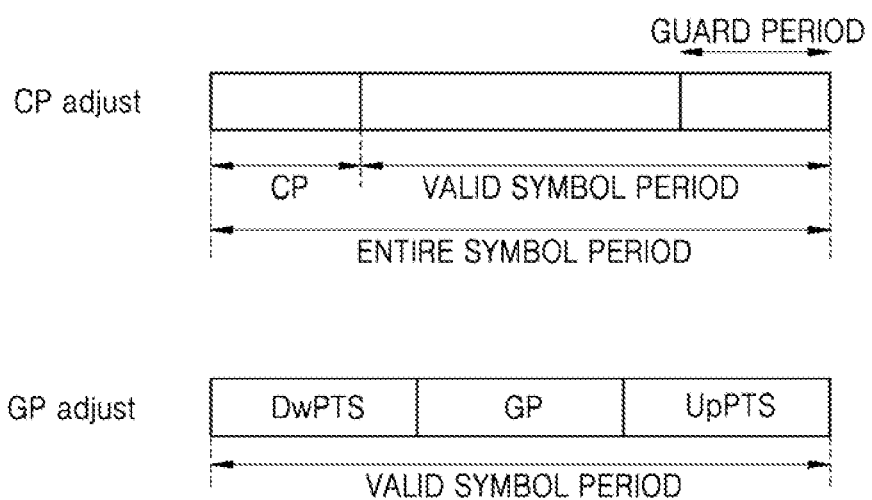
FIG. 5 is a view illustrating examples of communication parameters that can be adjusted according to the communication signal processing method illustrated in FIG. 3.

Referring to FIG. 5 together, in operation S390, the BTS 100 may control the length of CP of a communication signal.

According to an embodiment, the BTS 100 may change the length or type of CP in the entire symbol period of a communication signal. For example, the BTS 100 may increase the length of the CP of the communication signal when a redundant path is used. For example, the BTS 100 may change the CP of the communication signal from a normal CP type to an extended CP type when a redundant path is used.

In operation S390, the BTS 100 may control the length of a GP of the communication signal.

According to an embodiment, the BTS 100 may control the length of a GP located between a period DwPTS allocated for downlink communication and a period UpPTS allocated for uplink communication within a subframe of a time division duplexing (TDD) communication signal.

For example, the BTS 100 may increase the length of the GP of the communication signal when a redundant path is used.

The method and device according to an embodiment, by controlling parameters of a communication signal transmitted through a communication network based on a difference in transmission delay values when a redundant path is not used and when the redundant path is used, may eliminate the difference in transmission delay values even when a redundant path is used.

While the disclosure has been particularly shown and described with reference to embodiments thereof, it will be understood that various changes in form and details may be made therein without departing from the spirit and scope of the following claims.

What is claimed is:

1. A communication signal processing method performed by a base station, the communication signal processing method comprising:
   obtaining, from a headend device of the communication network by the base station, transmission delay value difference data relating to a difference in transmission delay values in a communication network, which varies depending on whether or not a redundant path is in use;
   obtaining, from the headend device of the communication network by the base station, redundancy status data indicating whether the redundant path is in use; and
   adjusting, by the base station, a parameter of a communication signal transmitted from the base station to the communication network based on the transmission delay value difference data if the redundancy status data indicates that the redundant path is in use and substituting for a communication signal path with a failure or a problem,
   wherein the redundancy status data is transmitted from the headend device of the communication network to the base station through an interface configured separately from a communication line through which the communication signal is transmitted, and
   wherein the redundant path is used when the failure or the problem occurs on the communication network, and a connection of the redundant path is performed under a control of the headend device of the communication network or network management system (NMS).

2. The communication signal processing method of claim 1, wherein the communication network is a distributed antenna system.

3. The communication signal processing method of claim 1, wherein the transmission delay value difference data is related to a difference between a first transmission delay value in the communication network when the redundant path is in use and a second transmission delay value in the communication network when the redundant path is not in use.

4. The communication signal processing method of claim 1, wherein the obtaining of the redundancy status data comprises:
   obtaining the redundancy status data based on whether at least one communication node is switched from among communication nodes in the communication network.

5. The communication signal processing method of claim 1, wherein the adjusting of the parameter of the communication signal comprises:
   controlling a time align (TA) value of the communication signal.

6. The communication signal processing method of claim 5, wherein the adjusting of the parameter of the communication signal comprises:
   in a case of using the redundant path, reducing the TA value of the communication signal to maintain a total delay value the same as in a case of not using the redundant path.

7. The communication signal processing method of claim 1, wherein the adjusting of the parameter of the communication signal comprises:
   controlling a length of cyclic prefix (CP) of the communication signal.

8. The communication signal processing method of claim 7, wherein the adjusting of the parameter of the communication signal comprises:
   in a case of using the redundant path, changing the CP of the communication signal from a normal CP type to an extended CP type.

9. The communication signal processing method of claim 1, wherein the adjusting of the parameter of the communication signal comprises:
   controlling a length of a guard period (GP) of the communication signal.

10. The communication signal processing method of claim 9, wherein the adjusting of the parameter of the communication signal comprises:
    in a case of using the redundant path, increasing the length of the GP of the communication signal.

11. A base station comprising:
    a memory; and
    a processor operatively connected to the memory and configured to:
       control a parameter of a communication signal according to a state of a distributed antenna system,
       obtain, from a headend device of the distributed antenna system, transmission delay value difference data relating to a difference in transmission delay values in the distributed antenna system, which varies depending on whether or not a redundant path is in use,
       obtain, from the headend device of the distributed antenna system, redundancy status data indicating whether the redundant path is in use, and
       adjust the parameter of the communication signal transmitted from the base station to the distributed antenna system based on the transmission delay value difference data if the redundancy status data indicates that the redundant path is in use and substituting for a communication signal path with a failure or a problem,
    wherein the redundancy status data is transmitted from the headend device of the distributed antenna system to the base station through an interface configured separately from a communication line through which the communication signal is transmitted, and
    wherein the redundant path is used when the failure or the problem occurs on the distributed antenna system, and a connection of the redundant path is performed under a control of the headend device of the distributed antenna system or network management system (NMS).

* * * * *